United States Patent
Tsuneyoshi et al.

(10) Patent No.: US 7,372,668 B2
(45) Date of Patent: May 13, 2008

(54) RECORDING AND/OR REPRODUCING DEVICE HAVING A POSITIONING ARRANGEMENT FOR POSITIONING A CLEANING BRUSH

(75) Inventors: Nobutaka Tsuneyoshi, Kanagawa (JP); Hiromi Inoguchi, Kanagawa (JP); Kouji Kobayashi, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 364 days.

(21) Appl. No.: 11/158,741

(22) Filed: Jun. 22, 2005

(65) Prior Publication Data

US 2006/0109589 A1 May 25, 2006

(30) Foreign Application Priority Data

Nov. 25, 2004 (JP) ............................. 2004-340177

(51) Int. Cl.
*G11B 5/41* (2006.01)
*G11B 15/67* (2006.01)

(52) U.S. Cl. ...................... 360/128; 360/95; 242/332.4
(58) Field of Classification Search ................. 360/95, 360/128; 226/92; 242/332.4
See application file for complete search history.

(56) References Cited

U.S. PATENT DOCUMENTS

| 5,793,580 | A | | 8/1998 | Argumedo et al. | |
|---|---|---|---|---|---|
| 6,067,211 | A | | 5/2000 | Chliwnyj et al. | |
| 6,067,212 | A | * | 5/2000 | Poorman | 360/128 |
| 6,208,488 | B1 | * | 3/2001 | Yamakawa et al. | 360/128 |
| 6,215,618 | B1 | * | 4/2001 | Anderson et al. | 360/128 |
| 6,252,739 | B1 | * | 6/2001 | Todd et al. | 360/128 |
| 6,359,751 | B1 | * | 3/2002 | Groel et al. | 360/128 |
| 6,590,742 | B2 | * | 7/2003 | Yamakawa | 360/128 |
| 6,678,118 | B2 | * | 1/2004 | Tanaka et al. | 360/128 |
| 6,697,212 | B2 | * | 2/2004 | Tsuchiya | 360/95 |
| 6,867,947 | B2 | * | 3/2005 | Davis | 360/128 |
| 6,945,488 | B2 | * | 9/2005 | Shimanuki et al. | 242/332.4 |
| 2002/0048118 | A1 | | 4/2002 | Tanaka et al. | |
| 2004/0042121 | A1 | * | 3/2004 | Davis | 360/128 |
| 2004/0169960 | A1 | * | 9/2004 | Hoelsaeter et al. | 360/128 |

FOREIGN PATENT DOCUMENTS

| EP | 0 102 897 A1 | | 3/1984 |
|---|---|---|---|
| EP | 800162 A2 | * | 10/1997 |
| EP | 1265237 A2 | * | 12/2002 |
| JP | 62125565 A | * | 6/1987 |
| JP | 06131637 A | * | 5/1994 |
| JP | 08017025 A | * | 1/1996 |
| JP | 11-328635 A | | 11/1999 |

(Continued)

*Primary Examiner*—William J. Klimowicz
(74) *Attorney, Agent, or Firm*—Frishauf, Holtz, Goodman & Chick, P.C.

(57) ABSTRACT

A brush driving mechanism, which drives a cleaning brush from a retracted position to an operation position opposed to a magnetic head, has a main arm having a tip coupled to the cleaning brush through a shaft. A chassis has a chassis slit, in which the shaft is inserted, for allowing to move the cleaning brush from the retracted position to the operation position by operating the main arm. The chassis slit has a tip portion stops the shaft when the cleaning brush is put into the operation position to position the cleaning brush with respect to the magnetic head.

5 Claims, 6 Drawing Sheets

FOREIGN PATENT DOCUMENTS

| | | | | |
|---|---|---|---|---|
| JP | 2000149236 A | * | 5/2000 | |
| JP | 2001101629 A | * | 4/2001 | |
| JP | 2002133618 A | * | 5/2002 | |
| JP | 2002157715 A | * | 5/2002 | |
| JP | 2002367127 A | * | 12/2002 | |
| WO | WO 00/30095 A1 | | 5/2000 | |
| WO | WO 00/30096 A1 | | 5/2000 | |

* cited by examiner

RECORDING AND/OR REPRODUCING DEVICE HAVING A POSITIONING ARRANGEMENT FOR POSITIONING A CLEANING BRUSH

This application claims priority to Japanese Patent Application JP 2004-340177, the disclosure of which is incorporated herein by reference.

BACKGROUND OF THE INVENTION

This invention relates to a recording and/or reproducing device represented by DLT (digital linear tape) or LTO (linear tape open) and, in particular, to a head cleaner mechanism for carrying out cleaning of a magnetic head.

Recording and/or reproducing devices of the type described are developed for use in back-up ones of computer systems and various types of the recording and/or reproducing devices have been proposed in prior art. Such a recording and/or reproducing device serving as the LTO is disclosed, for example, in the patent document WO 00/30096 A1.

The recording and/or reproducing device may be also a tape drive in which a cartridge having a single reel (a supply reel) can be installed. The cartridge may be also called a cassette. The recording and/or reproducing device contains a take-up reel therein. When the cartridge is installed in the recording and/or reproducing device, a magnetic tape is pulled out of the cartridge and then is wound by the take-up reel through a tape-transport path. The tape-transport path is for guiding the magnetic tape pulled out of the cartridge in a magnetic head. The magnetic head exchanges information between the tape and the magnetic head. In addition, the take-up reel is rotationally drivable by means of a real motor.

In the manner which is disclosed in the above-mentioned patent document WO 00/30096 A1, the cartridge comprises a housing, a rotationally drivable supply reel accommodated in the housing, the magnetic tape wound onto the reel hub of the supply reel, and a coupling element which is connected to the magnetic tape in the area of the free end of the magnetic tape and which is held in a coupling position. The coupling element is also called a leader pin.

In order to enable the magnetic tape contained in the cartridge to be wound onto the take-up reel, the magnetic tape should first be brought to the take-up reel with the aid of the leader pin. For this purpose, the recording and/or reproducing device has a pull-out element. The pull-out element is adopted to be coupled to the leader pin. The pull-out element is also called a grabber.

In order to enable the grabber to be coupled to the leader pin, the recording and/or reproducing device includes retaining means adapted to detachably retain the grabber. The retaining means are movably between a standby position and an operating position. A movement of the retaining means into their operating position causes a movement of the grabber in a coupling direction and the grabber and the leader pin to be coupled. On the other hand, a movement of the retaining means out of their operating position causes a movement of the grabber in a direction opposite to the coupling direction and the grabber and the leader pin to be disengaged.

In order to enable the grabber and the leader pin, after they have been coupled, i.e. a pull-out assembly thus formed, to be moved away from the retaining means an to be moved up to the reel hub of the take-up real, the recording and/or reproducing device includes actuating means. The actuating means are simply formed by a pull-out tape. The pull-out tape is guided along the above-mentioned tape-transport path. The pull-out tape is also called a leader tape.

The leader tape has one end connected to the grabber and has its other end connected to the reel hub of the take-up reel. Thus, by driving the take-up reel in a taking-up direction by a reel motor, the pull-out assembly can be moved away from the retaining means and up to the reel hub of the take-up reel with the aid of the leader tape which is simple in structure. At the reel hub, the pull-out assembly are brought to each other.

In the manner which is described above, the above-mentioned patent document WO 00/30096 A1 discloses the recording and/or reproducing device (the tape drive) employing the leader tape.

On the other hand, another recording and/or reproducing device employing a pantocam arm in lieu of the leader tape is disclosed, for example, in U.S. Pat. No. 6,067,211 to Chliwnyj et al., entitled: "Oscillating Magnetic Head and Stationary Brush Cleaning Apparatus." According to U.S. Pat. No. 6,067,211, the recording and/or reproducing device employs a pantocam arm which carries a leader pin for capturing a leader block, which is attached to the magnetic tape to be processed. After capturing the leader block, the pantocam arm swings the leader block around an arcuate tape guide and then lodges the leader block in a reel. When the reel is rotated, the magnetic tape moves adjacent to the magnetic head, which is located intermediate the tape guide. After the magnetic tape is processed, a supply reel in the cartridge returns the magnetic tape to the cartridge and the pantocam arm delivers the leader block to the cartridge, where it is released.

In such a recording and/or reproducing device, it is important to periodically clean out dirt on a surface of the magnetic head to obtain stable outputs of recording/reproducing. Therefore, the recording and/or reproducing device comprises a head cleaning mechanism. Inasmuch as the head cleaning mechanism removes the dirt on the surface of the magnetic head, a position relationship between both is important.

Chliwnyj et al. discloses a "magnetic tape drive" comprising a cleaning apparatus for cleaning the air bearing surface of a magnetic head of the magnetic tape drive by employing components of an actuator for oscillating the magnetic head against bristles of brush assembly. In the magnetic tape drive according to Chliwnyj at al., circuitry is provided which senses the appropriate time to commence the cleaning action and continues the cleaning action for an appropriate duration when the magnetic tape is off the magnetic head. The circuitry causes the actuator to move the magnetic head in oscillatory motion against stationary bristles of a brush assembly which are selectively brought into engagement with the magnetic head. The engagement and disengagement of the bristles with respect to the magnetic head are implemented by a lever arm which has camming surface which are engageable with a leader pin which moves a leader block and magnetic tape about a guide and across the magnetic head.

A further recording and/or reproducing device employing a threader arm in lieu of the leader tape is disclosed in Japanese Unexamined Patent Application Publication No. Hei 11-328635 (JP-A 11-3286351). JP-A 11-328635 discloses a "magnetic tape apparatus" which intends to be simple in structure and to enhance the reliability to the cleaning operation. The magnetic tape apparatus disclosed in JP-A 11-328635 includes a magnetic head having a read track position adjustment means and a brush which comes in touch with the magnetic head when the magnetic tape is not loaded and which opens a travel path for the magnetic tape when the magnetic tape is loaded. When the magnetic tape is not loaded, the magnetic head is driven by the read track position adjustment means, so that the magnetic head is cleaned.

In the recording and/or reproducing devices without employing the leader tape as disclosed in the above-mentioned U.S. Pat. No. 6,067,211 or the above-mentioned JP-A 11-328635, it is possible to arrange a cleaning brush so as to face the cleaning brush to the magnetic head with a running path of the magnetic tape put therebetween because there is no leader tape. Therefore, it is possible to easily carry out positioning of the cleaning brush with respect to the magnetic head.

However, in the recording and/or reproducing device employing the leader tape as disclosed in the above-mentioned patent document WO 00/30096 A1, it is impossible to arrange the cleaning brush so as to face the cleaning brush to the magnetic head. This is because the leader tape is between the takeup reel and the retaining means. Therefore, in order to drive the cleaning brush, a brush driving mechanism requires a lot of parts which operate when interlocked with a driving source. As a result, in order to accurately position the cleaning brush with respect to the magnetic head, it is necessary to improve accuracy in each part and to make a width of the cleaning brush larger. Accordingly, the conventional brush driving mechanism is disadvantageous in that it drives up costs and it takes up space for the placement of the parts.

In addition, it is necessary to hold and fix the cleaning brush to be stable during cleaning of the magnetic head after positioning the cleaning brush with respect to the magnetic head.

SUMMARY OF THE INVENTION

It is therefore an object of the present invention to provide a brush driving mechanism which is capable of precisely positioning a cleaning brush with respect to a magnetic head, and which is simple in structure, in a recording and/or reproducing device employing a leader tape.

Other objects of this invention will become clear as the description proceeds.

On describing the gist of an aspect of this invention, it is possible to be understood that a recording and/or reproducing device comprises a chassis, a magnetic head, a head actuator for holding the magnetic head and for moving the magnetic head up or down on said chassis, a take-up reel rotatably mounted on the chassis, a grabber connected to the take-up reel through a leader tape, a cleaning brush for cleaning the magnetic head, and a brush driving mechanism for driving the cleaning brush from a retracted position to an operation position opposed to the magnetic head. According to the aspect of this invention, the brush driving mechanism includes a main arm having a tip coupled to the cleaning brush through a shaft. The chassis has a chassis slit in which the shaft is inserted to allow to move the cleaning brush from the retracted position to the operation position by operating the main arm. The brush driving mechanism comprises a positioning arrangement for positioning the cleaning brush with respect to the magnetic head.

In the above-mentioned recording and/or reproducing device, the positioning arrangement may comprise a tip portion of the chassis slit which stops the shaft when the cleaning brush is put into the operation position. In addition, the brush driving mechanism preferably may further comprise a stable fixing arrangement for holding and fixing the cleaning brush to be stable at the operation position when the cleaning brush is positioned by the positioning arrangement. In this event, the positioning arrangement may comprise a tip portion of the chassis slit which stops the shaft when the cleaning brush is put into the operation position and the stable fixing arrangement may comprise an urging arrangement for urging the cleaning brush so as to press the cleaning bush against the tip portion of the chassis slit. In addition, the driving mechanism may further comprise a sub arm interlocked with the main arm and the urging arrangement may comprise a spring provided in the sub arm.

In addition, in the above-mentioned recording and/or reproducing device, the recording and reproducing device is able to load a cartridge for accommodating a magnetic tape connected to a leader pin at one end portion thereof. The grabber and the leader pin are coupled to form a pull-out assembly when the cartridge is loaded in said recording and/or reproducing device. The brush driving mechanism may be operable by rotating a cam gear for use in detaching/attaching the leader pin from/to the grabber and the main arm may be interlocked to the cam gear. In this event, the brush driving mechanism moves the cleaning brush from the retracted position to the operation position so that the brush driving mechanism is driven by rotation of the cam gear after the cartridge is loaded in the recording and/or reproducing device or after the magnetic tape is rewound in the cartridge.

DESCRIPTION OF THE PREFERRED EMBODIMENT

Figure 1:
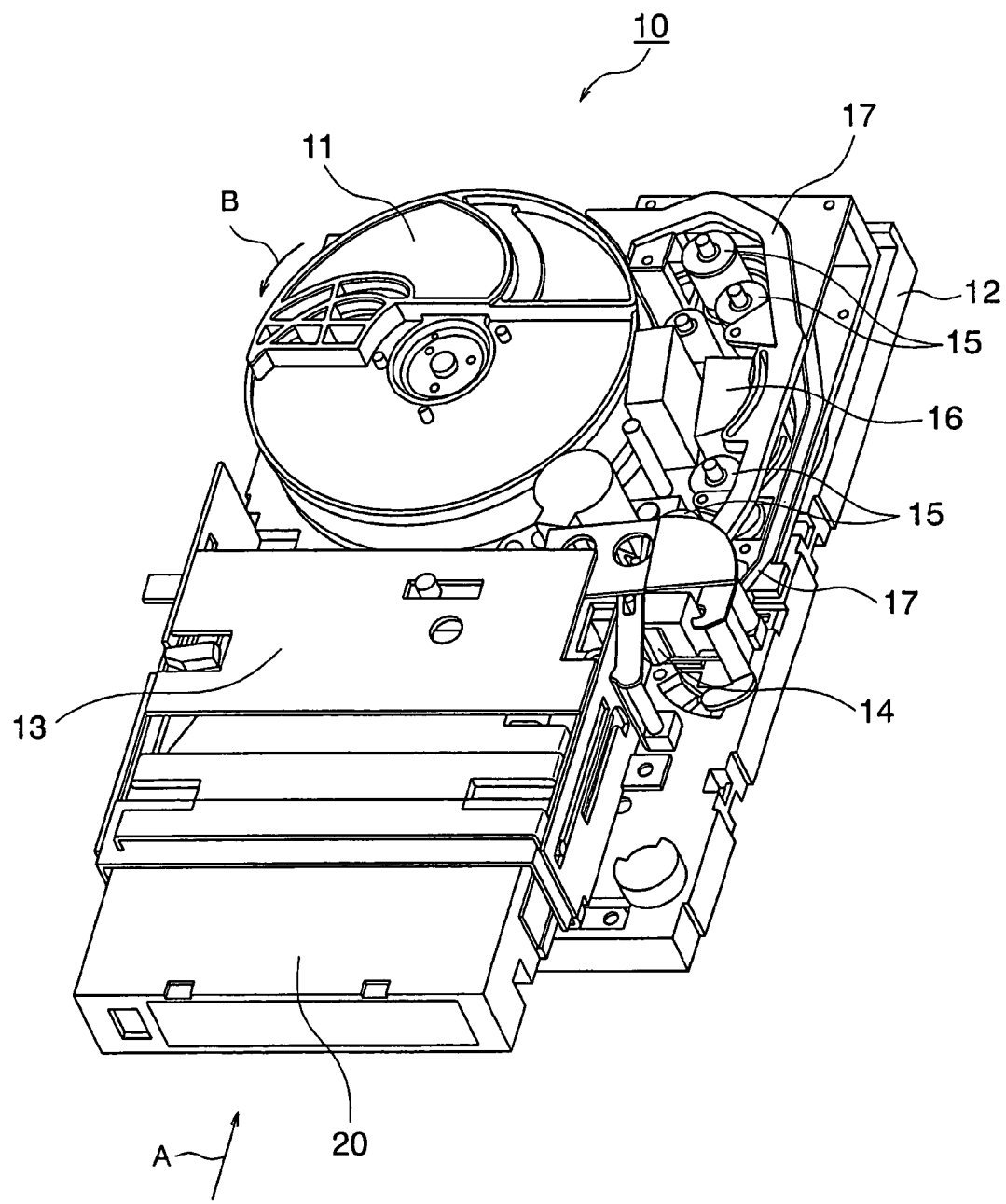
FIG. 1 is a plan view showing a tape drive serving as a recording and/or reproducing device to which this invention is applicable with an upper cover removed therefrom.
Figure 2:
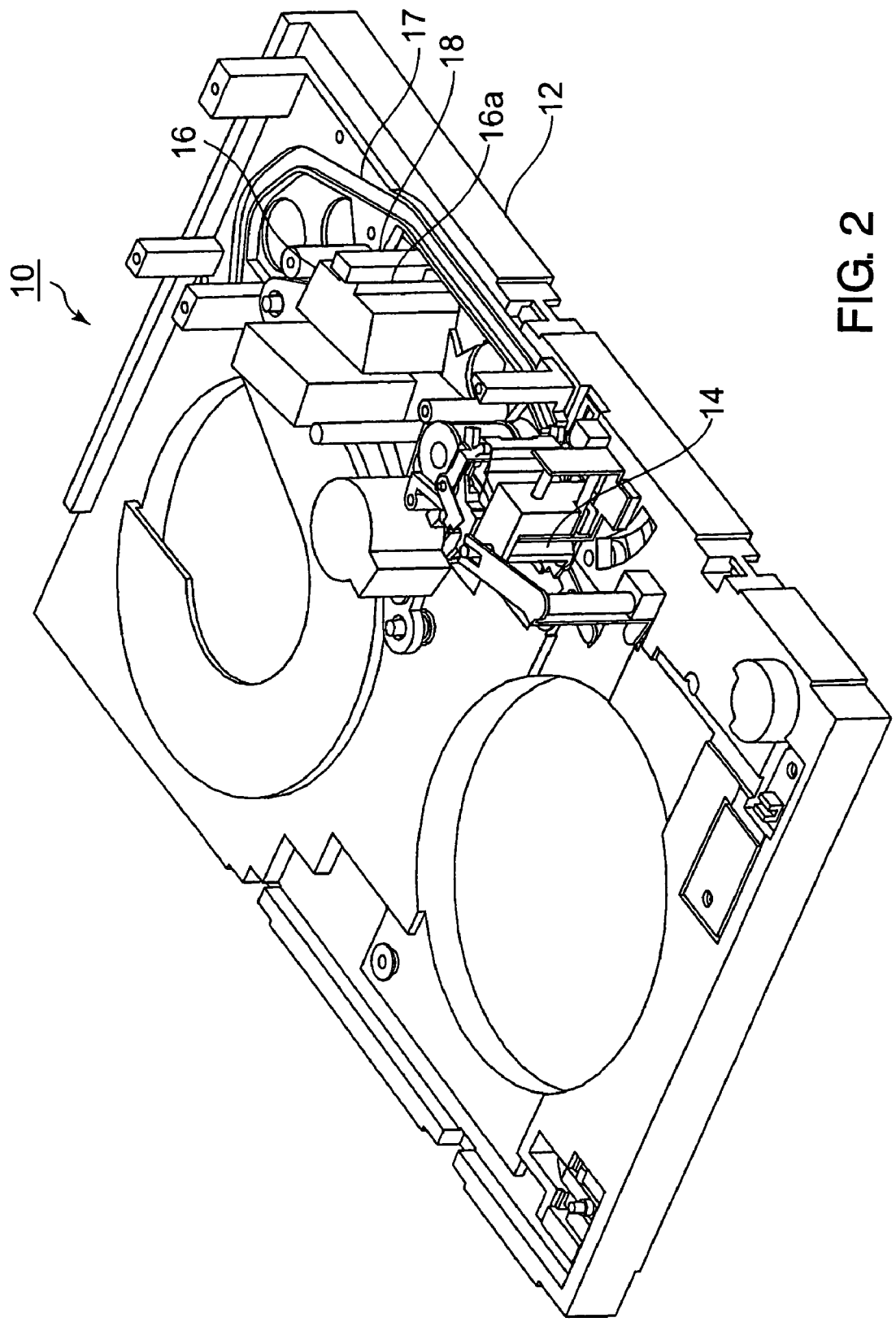
FIG. 2 is a perspective view showing the external appearance of a main portion of the tape drive illustrated in FIG. 2 at a state seen from a front surface side.
Figure 3:
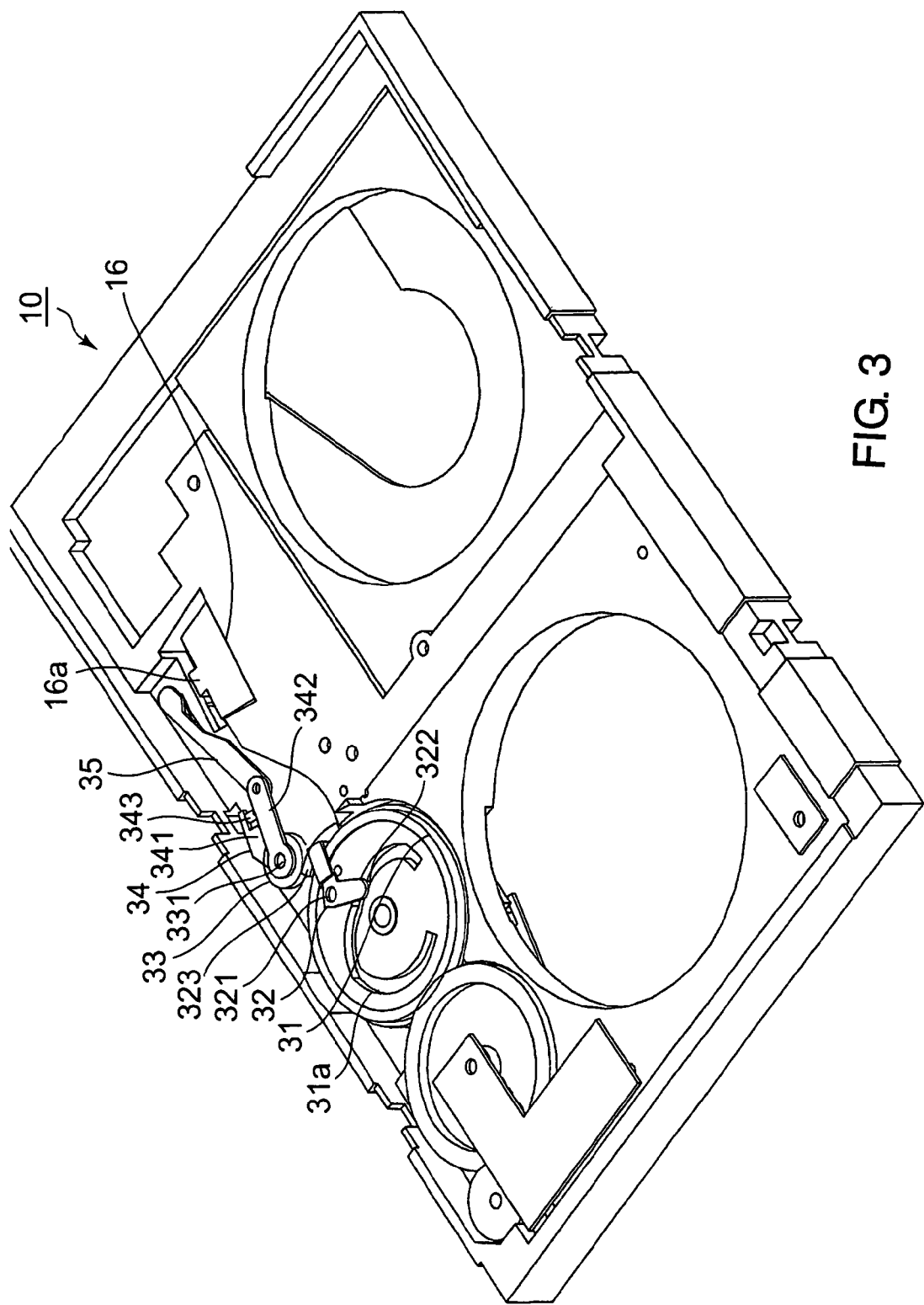
FIG. 3 is a perspective view showing the external appearance of the tape drive illustrated in FIG. 1 at a state seen from a rear surface side.
Figure 4:
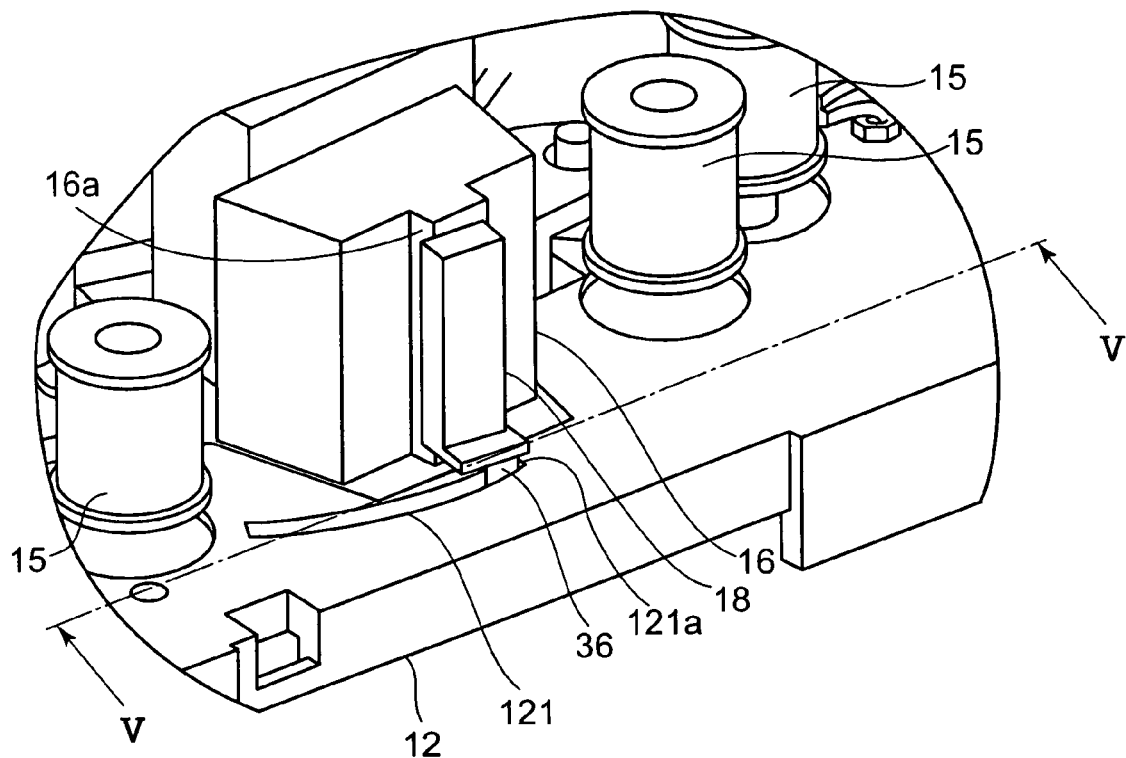
FIG. 4 is a partially enlarged perspective view of a part of the tape drive illustrated in FIG. 2.
Figure 5:
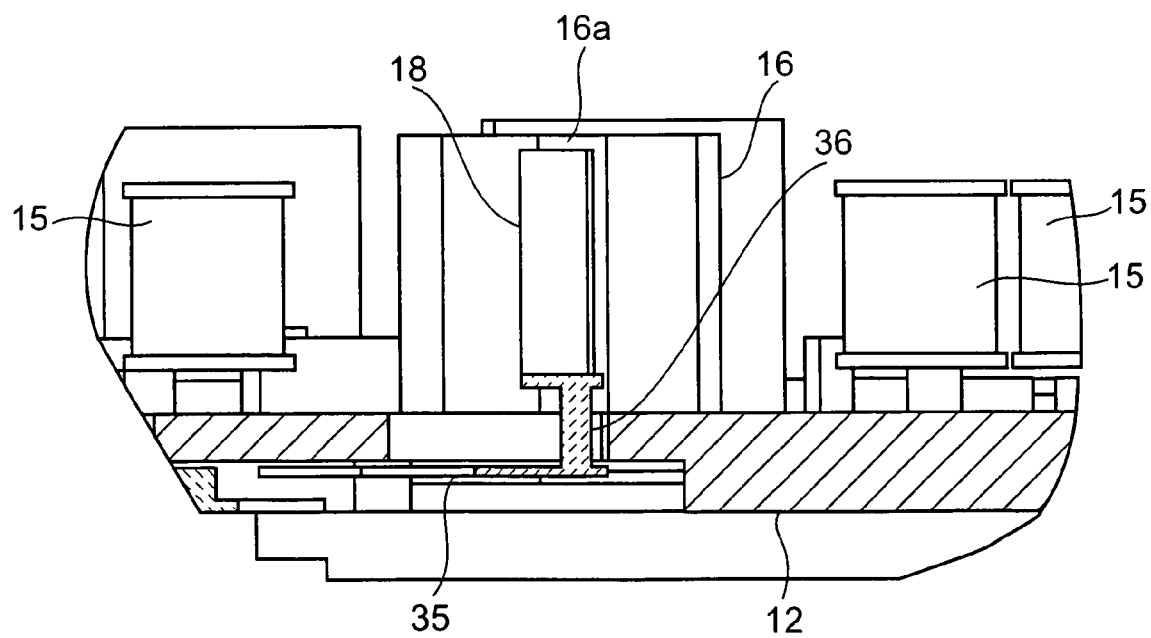
FIG. 5 is a sectional view taken substantially along the lines V-V of FIG. 4.

Referring to FIG. 1, the description will proceed to a tape drive 10 serving as a recording and/or reproducing device to which this invention is applicable. FIG. 1 is a plan view showing the tape drive 10 with an upper cover removed therefrom.

The tape drive 10 is for receiving a cartridge 20 and contains a take-up reel 11 inside thereof. The take-up reel 11 is also called a spool. The tape drive 10 is generally comprised of a rectangular housing (chassis) 12 that has a common base. The base has first and second spindle motors (reel motors) (not shown). The first spindle motor has the spool (or the take-up reel) 11 permanently mounted on the base of the housing 12 and the spool 11 is dimensioned to accept a relatively high speed streaming magnetic tape (not shown). At any rate, the take-up reel 11 is rotatably mounted on the chassis 12.

The second spindle motor (reel motor) is adapted to accept the removable cartridge 20. The removable cartridge 20 is inserted into the tape drive 10 via a lift 13 formed on the housing 12 of the tape drive 10 along an insertion direction depicted at an arrow A.

Upon insertion of the cartridge 20 into the lift 13, the cartridge 20 engages the second spindle motor (the supply reel motor). Prior to rotation of the first and the second spindle motors (reel motors), the cartridge 20 is connected to the permanently mounted spool (the take-up reel) 11 by means of a connection between a grabber 14 and a leader pin (not shown). A number of rollers (guide rollers) 15 positioned intermediate the cartridge 20 and the permanent spool 11 guide the magnetic tape as it traverses at relatively high speeds back and forth between the cartridge 20 and the permanently mounted spool 11. At any rate, the tape drive 10 is able to load the cartridge 20 for accommodating the magnetic tape connected to the leader pin at one end portion thereof.

The tape drive 10 further comprises a head actuator assembly 16. The head actuator 16 is located between the take-up spool 11 and the cartridge 20 on a tape-transport path (not shown) defined by the above-mentioned plurality of rollers 15. The head actuator 16 comprises a magnetic head (which will later be described). During operation, the magnetic tape flows forward and backward between the take-up spool 11 and the cartridge 20 and is closely adjacent to the head actuator 16 while the magnetic tape flows on the defined tape-transport path.

The cartridge 20 accommodates a rotationally drivable supply reel (not shown). The cartridge 20 further accommodates the magnetic tape wound on a reel hub of the supply reel. The cartridge 20 includes the leader pin connected to the magnetic tape at the free end portion of the magnetic tape. In the cartridge 20, the leader pin is held in a coupling position by means of two positioning forks (not shown).

In addition, in order to enable the grabber 14 to be coupled to the leader pin, the tape drive 10 includes a grabber holder (not shown) adapted to detachably retain the grabber 14. The grabber holder is rotatably and slidably mounted on the chassis 12.

In order to enable the grabber 14 and the leader pin, after they have been coupled, i.e. a pull-out assembly thus formed, to be moved away from the grabber holder and to be moved up to the reel hub of the take-up reel 11, the tape drive 10 includes a leader tape (not shown). The leader tape is guided along the tape-transport path. The tape-transport path is defined by the above-mentioned rollers 15.

The leader tape has one end connected to the grabber 14 and has its other end connected to the reel hub of the takeup reel 11. Thus, by driving the takeup reel 11 in a direction (a takingup direction) indicated by an arrow B in FIG. 1 by a reel motor (not shown), the pullout assembly can be moved away from the grabber holder (not shown) and up to the reel hub of the takeup reel 11 with the aid of the leader tape. In this event, at the reel hub, the reel hub and the pullout assembly are brought to each other.

During the movement of the pull-out assembly away from the grabber holder and towards the reel hub of the take-up reel 11 and also during the movement in the opposite direction, the pull-out assembly should be moved without contact past the rollers 15 and past the magnetic head of the head assembly 16. Therefore, the tape drive 10 comprises a pair of rails 17 which extend essentially adjacent the tape-transport path and which, in the width direction of the magnetic tape, are spaced apart by a distance larger than the width of the magnetic tape.

Referring to FIGS. 2 through 5, the description will proceed to a brush driving mechanism according to an embodiment of this invention. The head actuator 16 holds the magnetic head 16a in the manner which is described above. The head actuator 16 moves the magnetic head 16a up or down on the chassis 12 with the magnetic head 16a held by the head actuator 16. The brush driving mechanism is for driving a cleaning brush 18 for cleaning the magnetic head 16a from a retracted position to an operation position opposed to the magnetic head 16a.

The brush driving mechanism comprises a cam gear 31, an auxiliary arm 32, a gear 33, a sub arm 34, a main arm 35, and a shaft 36.

The cam gear 31 is also used by driving the above-mentioned grabber holder and is rotatably driven by a motor which is not shown. In other words, the cam gear 31 is for use in detaching/attaching the leader pin from/to the grabber 14. The cam gear 31 has a cam ditch 31a dug therein. The cam gear 31 is covered with a sub chassis (not shown) which is mounted on the chassis 12. The auxiliary arm 32 is rotatably mounted on the sub chassis around a rotation axis 321. The auxiliary 32 has one end provided with an engaging pin 322 which is engaged with the cam ditch 31a of the cam gear 31. The auxiliary arm 32 has another end provided with a gear 323. The gear 33 is engaged with the gear 323 and is rotatably mounted on the chassis 12 around its rotation axis 331. The sub arm 34 is rotatably provided at the rotation axis 331 of the gear 33 coaxially.

The sub arm 34 comprises a first arm 341, a second arm 342, and a spring 343 for connecting the first and the second arms 341 and 342. The first arm 341 is fixed to the gear 33. The second arm 342 has an end which is rotatably mounted to the rotation axis 331. The second arm 342 has another end which is coupled to an end of the main arm 35. The main arm 35 has another end (a tip) on which the cleaning brush 18 is mounted through the shaft 36. In other words, through the shaft 36, the cleaning brush 18 is coupled to the main arm 35.

On the other hand, the chassis 12 has a chassis slit 121 which is cut along a path of the main arm 35. When the shaft 36 reaches to a top (a tip portion) 121a of the chassis slit 121, the cleaning brush 18 is put into a position relationship opposed to the magnetic head 16a. That is, the shaft 36 is inserted in the chassis slit 121, the chassis slit 121 is for moving the cleaning brush 18 from the retracted position to the operation position by operating the main arm 35.

In the manner which is described above, the main arm 36 is coupled to the cam gear 31 through the sub arm 34, the gear 33, and the auxiliary arm 32.

Figure 6:
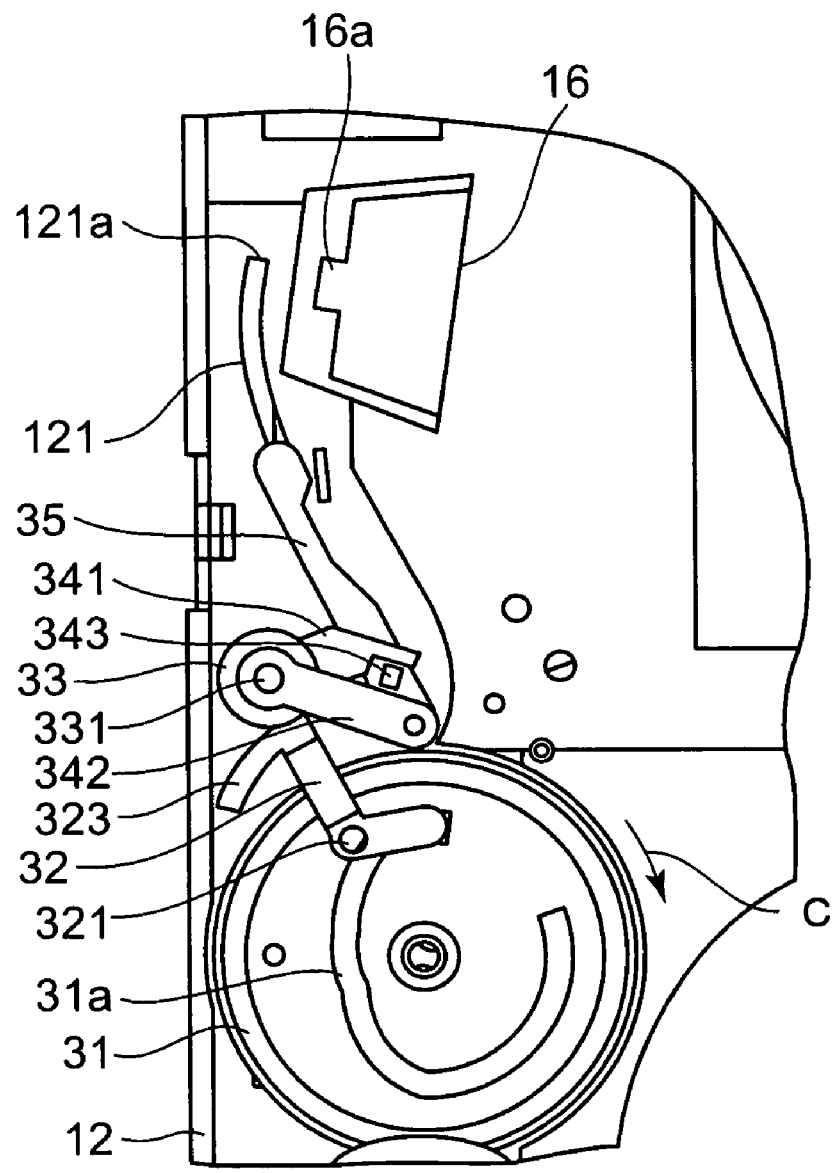
FIG. 6 is a bottom view showing a brush driving mechanism in a case where a cleaning brush is put into a standby state (a retracted position)
Figure 7:
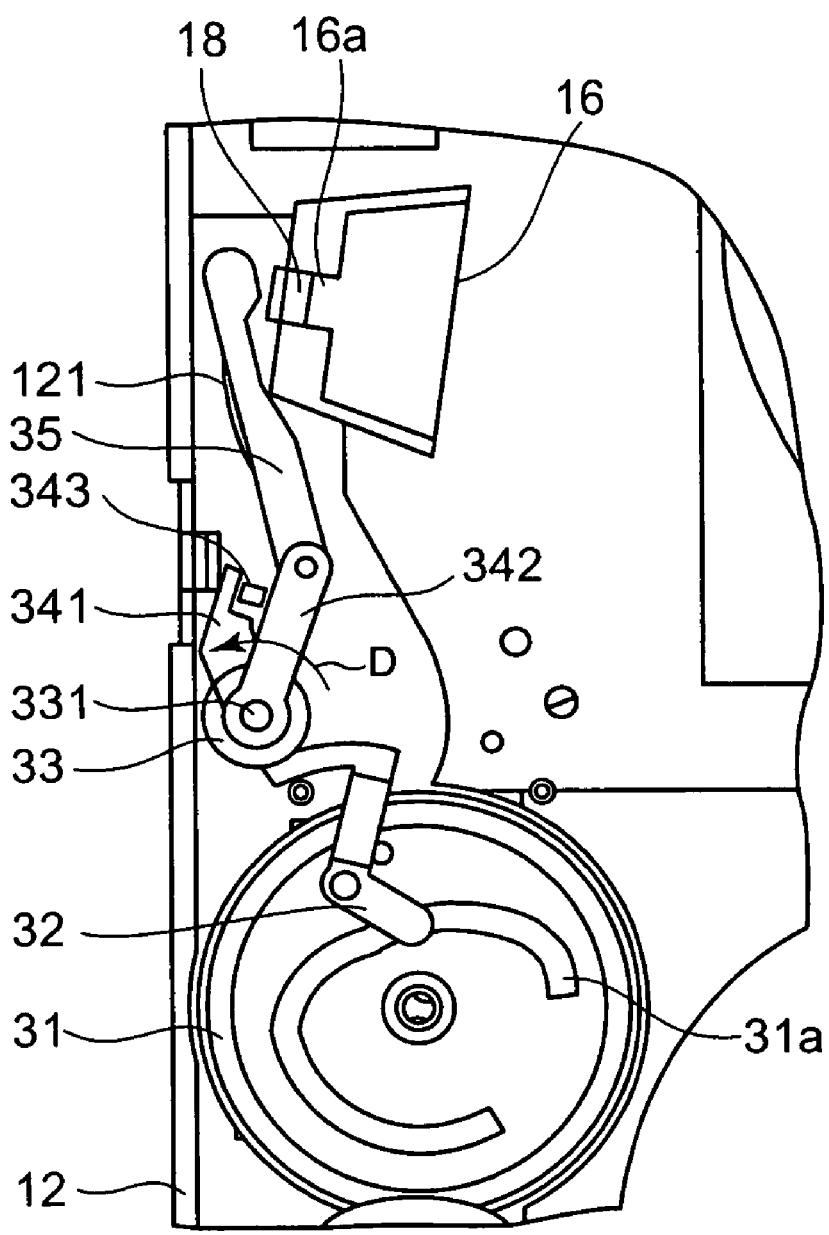
FIG. 7 is a bottom view showing the brush driving mechanism in a case where the cleaning brush is put into a state (an operation position) opposed to a magnetic head.

Referring now to FIGS. 6 and 7, description will be made as regard operation of the brush driving mechanism. FIG. 6 shows the brush driving mechanism in a case where the cleaning brush 18 is put into a standby state (the retracted position). FIG. 7 shows the brush driving mechanism in a case where the cleaning brush 18 is put into a state (the operation position) opposed to the magnetic head 16a.

As shown in FIG. 6, when the cleaning brush 18 is put into the standby state, at one end side of the cam ditch 31a of the cam gear 31, the engaging pin 322 provided in the one end of the auxiliary arm 21 is engaged. In this state, the cleaning brush 18 is put into the retracted position where the cleaning brush 18 is retracted from the magnetic head 16a. In addition, in this state, the leader tape is put into a position apart from the magnetic head 16a. This can be made by rewinding the magnetic tape to the supply reel of the cartridge 20 to hold the pull-out assembly (the grabber 14) in the grabber holder and thereafter by rewinding the take-up reel 11 in a rewinding direction (the direction opposed to the winding direction B in FIG. 1) a little.

In this state, it will be assumed that the cam gear 31 is rotated in clockwise direction in FIG. 6 as shown in an arrow C of FIG. 6. In this event, inasmuch as the engaging pin 322 of the auxiliary arm 32 is engaged with the cam ditch 31a, the engaging pin 322 moves along the cam ditch 31a and then the auxiliary arm 32 rotates around its rotation axis 321 in a clockwise direction. Therefore, engaged with the gear 323 of the auxiliary arm 32, the gear 33 rotates around its rotation axis 331 in a counterclockwise direction. Therefore, fixed to the gear 33, the sub arm 34 also rotates around the rotation axis 331 in a counterclockwise direction, and the main arm 35, which has the end connected to the other end of the second arm 342 of the sub arm 34, moves along the chassis slit 121 nearer to the magnetic head 16a.

As shown in FIG. 7, the cam gear 31 is rotated in a clockwise direction until the shaft 36 stops to the tip portion 121a of the chassis slit 121. Therefore, coupled to the other end (the tip) of the main arm 35 through the shaft 36, the cleaning brush 18 is opposed to the magnetic head 16a as shown in FIG. 7. That is, the cleaning brush 18 is positioned with respect to the magnetic head 16a with precision. In other words, the tip portion 121a of the chassis slit 121 is for stopping the shaft 36 when the cleaning brush 18 is put into the operation position and serves as a positioning arrangement for positioning the cleaning brush 18 with respect to the magnetic head 16a.

In the manner which is described above, a positioning accuracy of the cleaning brush 18 depends on only dimensional accuracy in the tip portion 121a of the chassis slit 121. Accordingly, it is possible to carry out positioning of the cleaning brush 18 with precision by improving only the dimensional accuracy in the tip portion 121a of the chassis slit 121 although accuracy in other parts is not high. Therefore, it is possible to reduce costs in the parts constituting the brush driving mechanism.

In this state, the cam gear 31 is further rotated in a clockwise direction a little. In this event, the auxiliary arm 32 in which the engaging pin 322 is engaged with the cam ditch 31a rotates around its rotation axis 321 in a clockwise direction. As a result, engaged with the gear 323 of the auxiliary arm 32, the gear 33 rotates around its rotation axis 331 in counterclockwise direction as shown in an arrow D of FIG. 7. Therefore, fixed to the gear 33, the first arm 341 of the sub arm 34 also rotates in the counterclockwise direction. Inasmuch as the first arm 341 is coupled to the second arm 342 through the spring 343, the second arm 342 is acted upon by a rotation force in a direction depicted at the arrow D of FIG. 7. Accordingly, the main arm 35, which has the end coupled to the other end of the second arm 342, is acted upon by a force so as to press the other end (the tip) of the main arm 35 against the tip portion 121 of the chassis slit 121.

It is therefore possible to hold and fix the cleaning brush 18 on the chassis 12 to be stable. In other words, although the tape drive 10 is subjected to vibrations or impact, the cleaning brush 18 is stably positioned at its driving position while dirt is cleaned off a surface of the magnetic head 16a by the cleaning brush 18. At any rate, the spring 343 serves as an urging arrangement for urging the shaft 36 so as to press the shaft 36 against the tip portion 121a of the chassis slit 121. In addition, the urging arrangement (the spring) 343 acts as a stable fixing arrangement for holding and fixing the cleaning brush 18 to be stable at the operation position when the cleaning brush 18 is positioned by the positioning arrangement (the tip portion 121a of the chassis slit 121).

In addition, cleaning of the magnetic head 16a by the cleaning brush 18 is carried out by moving the magnetic head 16a up or down by driving the head actuator 16 so as to it move up or down in the manner which is described in the above mentioned U.S. Pat. No. 6,067,211 or the above-mentioned JP-A 11-328635.

In addition, in the manner which is described above, the brush driving mechanism according to the embodiment of this invention is operable by rotating the cam gear 31 for use in detaching/attaching the leader pin from/to the grabber 14. The main arm 35 is interlocked to the cam gear 31. Therefore, the brush driving mechanism moves the cleaning brush 18 from the retracted position to the operation position so that the brush driving mechanism is driven by rotation of the cam gear 31 after the cartridge 20 is loaded in the tape drive 10 or after the magnetic tape is rewound in the cartridge 20.

In the manner which is described above, inasmuch as the cam gear 31 is doubled as the brush driving mechanism according to this invention and a leader pin removable mechanism, it is possible to decrease the number of parts in the tape drive 10.

While this invention has thus far been described in conjunction with a preferred embodiment thereof, it is to be understood that modifications will be apparent to those skilled in the art without departing from the spirit of the invention. For example, although the tip portion 121a of the chassis slit 121 is used as the positioning arrangement in the above-mentioned embodiment, a boss, a wall, or the like provided on the chassis may be used as the positioning arrangement.

What is claimed is:

1. A recording and/or reproducing device comprising:
   a chassis;
   a magnetic head;
   a head actuator for holding said magnetic head and for moving said magnetic head up and down;
   a take-up reel rotatably mounted on said chassis;
   a grabber connected to said takeup reel via a leader tape;
   a cleaning brush for cleaning said magnetic head;
   a brush driving mechanism for moving said cleaning brush between a retracted position and an operation position at which said cleaning brush is opposed to said magnetic head;
   wherein said brush driving mechanism includes a main arm having a tip coupled to said cleaning brush via a shaft;
   wherein said chassis has a chassis slit in which said shaft is inserted such that said cleaning brush is movable from said retracted position to said operation position by operating said main arm;
   wherein said brush driving mechanism comprises a positioning arrangement for positioning said cleaning brush with respect to said magnetic head;
   wherein said recording and/or reproducing device is adapted to load a cartridge for accommodating a magnetic tape that is connected to a leader pin at one end portion thereof, and said grabber and said leader pin are adapted to be coupled to form a pull-out assembly when said cartridge is loaded in said recording and/or reproducing device;
   wherein said brush driving mechanism is operable by rotating a cam gear for use in detaching said leader pin from and attaching said leader pin to said grabber, and said main arm is interlocked to said cam gear; and wherein said brush driving mechanism is driven by rotation of said cam gear at least one of after said cartridge is loaded in said recording and/or reproducing device and after said magnetic tape is rewound in said cartridge, to move said cleaning brush from said retracted position to said operation position.

2. The recording and/or reproducing device as claimed in claim 1, wherein said positioning arrangement comprises a tip portion of said chassis slit, which stops said shaft when said cleaning brush is positioned at the operation position.

3. The recording and/or reproducing device as claimed in claim 1, wherein said brush driving mechanism further comprises a stable fixing arrangement for holding and fixing said cleaning brush to be stable at the operation position when said cleaning brush is positioned by said positioning arrangement.

4. The recording and/or reproducing device as claimed in claim 3, wherein said positioning arrangement comprises a tip portion of said chassis slit, which stops said shaft when said cleaning brush is positioned at the operation position; and wherein said stable fixing arrangement comprises an urging arrangement for urging said cleaning brush so as to press said shaft against the tip portion of said chassis slit.

5. The recording and/or reproducing device as claimed in claim 4, wherein said brush driving mechanism further comprises a sub arm interlocked with said main arm, and said urging arrangement comprises a spring provided in said sub arm.

* * * * *